Jan. 11, 1955
H. J. BRETTRAGER
2,699,341
TRAILER HITCH DOLLY
Filed June 25, 1952
2 Sheets-Sheet 1
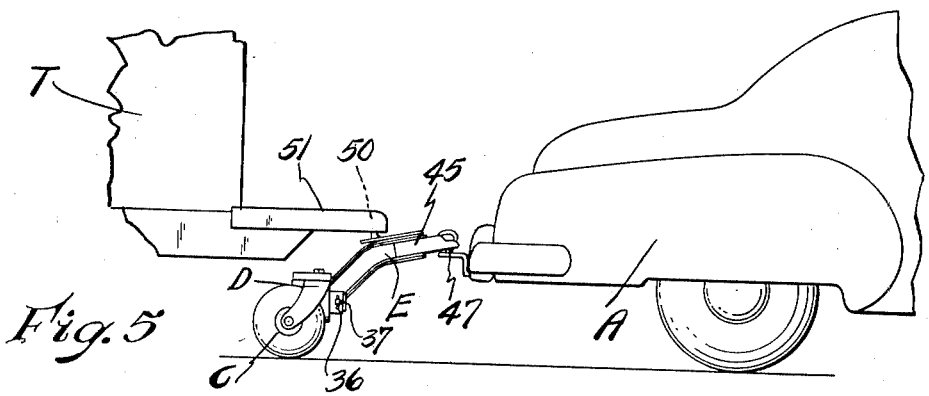
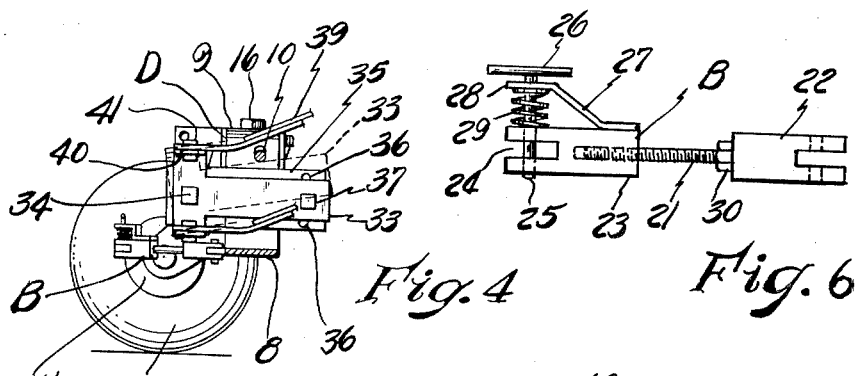
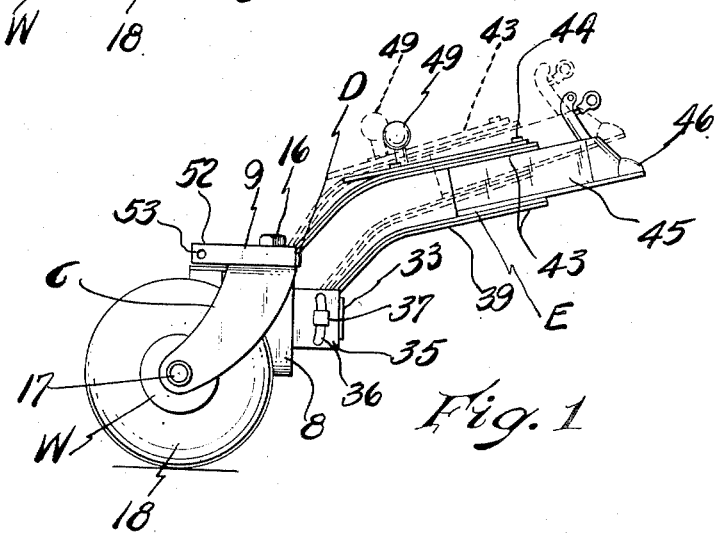
INVENTOR.
Henry Brettrager
BY
Fearman & Fearman
ATTORNEYS

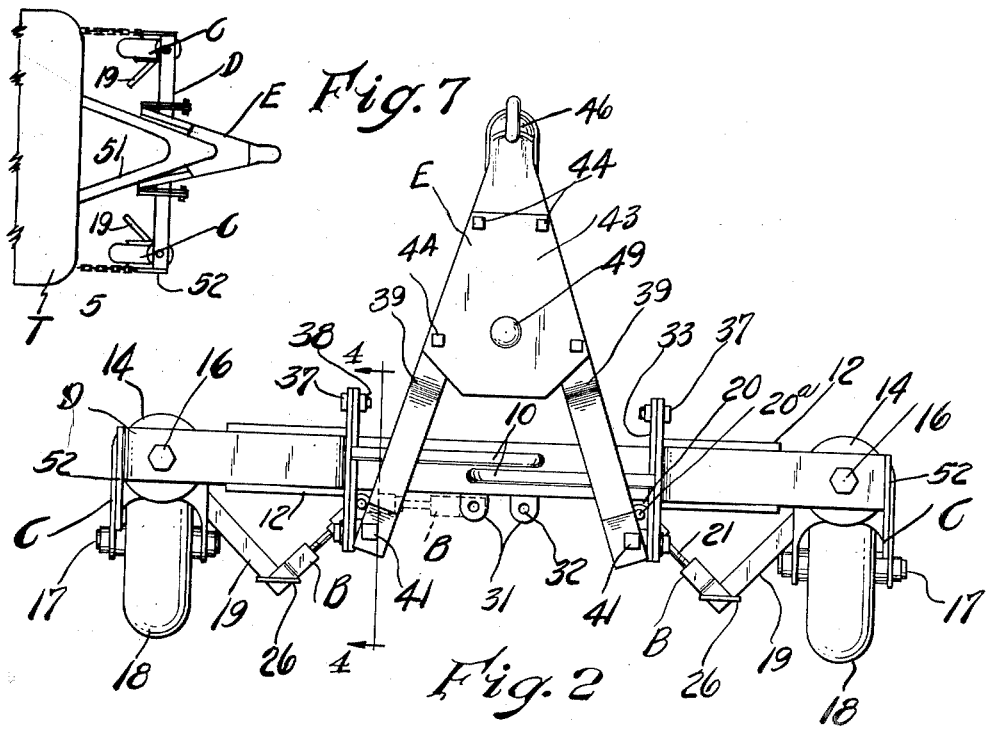
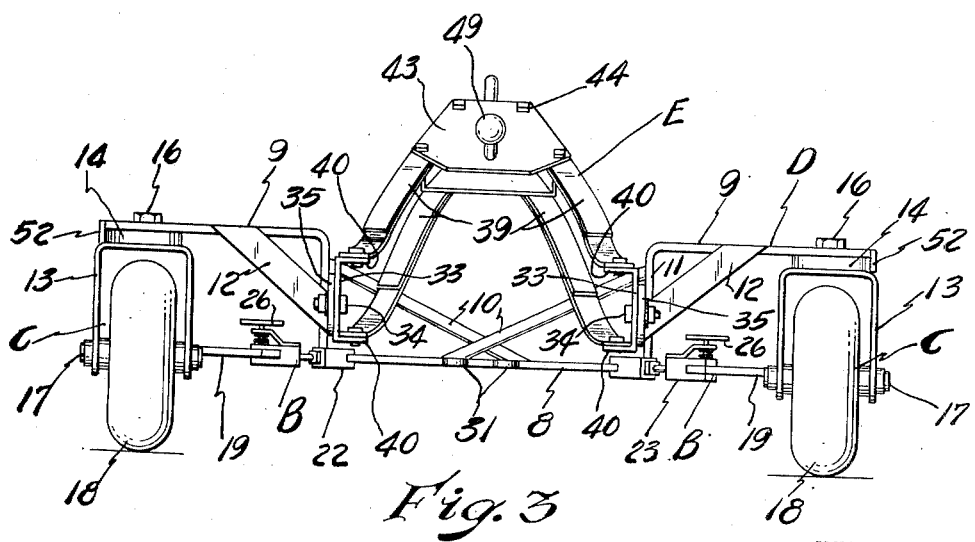

United States Patent Office 2,699,341
Patented Jan. 11, 1955

2,699,341

TRAILER HITCH DOLLY

Henry J. Brettrager, Saginaw, Mich.

Application June 25, 1952, Serial No. 295,417

5 Claims. (Cl. 280—476)

This invention relates to trailer hitch dollies or trucks and more particularly to a trailer dolly or truck for interpositioning between a towing vehicle and a house trailer or the like.

It is well-known that modern trailers are becoming increasingly heavy and tend to severely overload the rear suspension system of present-day passenger vehicles. Many trailers are supported by but a single set of wheels, and other supported by four wheels are often unbalanced and tend to impose considerable stress on the frame of the towing vehicle and to break down its rear suspension system.

One of the prime objects of the invention is to provide a trailer hitch dolly which, by supporting the weight of the forward end of the trailer and functioning as the coupling through which the towing vehicle draws the trailer, balances the trailer and relieves the towing vehicle of the greater portion of the weight thereof and also the stresses and strains imposed thereby.

A further object of the invention is to provide a trailer dolly which carries the weight of the forward end of the trailer centrally and includes an independently mounted suspension system to uniformly distribute the load and road shock so that the trailer and towing car ride smoothly and easily.

A still further object of the invention is to design a trailer dolly provided with vertically adjustable means for adjusting the angle of the tongue with relation to the towing vehicle so that it can be adjusted to suit vehicles of various heights, design, and/or vehicle loads without changing the angle of pull of the tongue or the balance of the towed trailer.

A further object of the invention is to design a vertically adjustable dolly wherein the balance of the trailer and the dolly may be retained at all times to provide efficient towing, and wherein the frame of the dolly is maintained in substantially horizontal position to evenly and uniformly distribute the load imposed thereon.

Another object of the invention is to design a dolly which includes castered supporting wheels and readily disengageable means for locking the wheels in longitudinal position, so that the dolly will not drag or shimmy during its forward travel.

A further object of the invention is to provide flexible means on the dolly for connection with the trailer to control the castering of the wheels which are unlocked for backing and permit the trailer to be accurately backed without jack-knifing.

A further object of the invention is to provide means on the trailer dolly frame for engagement by the wheel locking means when said means are swung to unlocked position to prevent their swinging out and possibly fouling the castered wheels when the trailer is being backed.

A still further object of the invention is to design a trailer hitch dolly of strong and durable construction, and composed of a minimum number of parts, all of which can be easily and economically manufactured and assembled.

With the above and other objects in view, the present invention consists in the combination and arrangement of parts, hereinafter more fully described, illustrated in the accompanying drawings, and more particularly pointed out in the appended claims, it being understood that changes may be made in the form, size, proportion, and minor details of construction, without departing from the spirit, or sacrificing any of the advantages of the invention.

In the drawings:

Fig. 1 is an end elevational view of my trailer hitch dolly, the broken lines indicating the vertical adjustment of the draft tongue.

Fig. 2 is an enlarged, top plan view of the dolly, the broken lines showing the wheel locking member swung to engage the dolly frame.

Fig. 3 is a rear elevational view thereof.

Fig. 4 is a transverse sectional view taken on the line 4—4 of Fig. 2, the broken lines showing the adjustment of the tongue plate.

Fig. 5 is a fragmentary, side elevational view showing the dolly interposed between a conventional house trailer and a towing vehicle.

Fig. 6 is an enlarged side elevational view of one of the brace arms.

Fig. 7 is a top plan view showing the castered wheels free to caster and the chains used when backing.

Referring now more specifically to the accompanying drawings wherein I have shown the preferred embodiment of my invention, a letter D generally indicates my trailer dolly which is shown in Fig. 5, supporting the front end of a trailer T, and drawn by a towing vehicle A as usual.

The dolly D includes a U-shaped frame member 8 having horizontally bent arm extensions 9 formed integral therewith, and in the present instance the frame is formed of a continuous bar cut to proper length. Diagonally disposed rods 10 are welded to the lower section of the frame 8 and to the vertical legs 11 to reinforce said frame, and bars 12 are welded to the arms 9 and legs 11 to further strengthen the structure.

Castered wheel assemblies C support the frame 8 and include wheel forks 13 and disk plates 14 revolvably mounted with relation to the arms 9, spindles (not shown) projecting from the plate 14 through the arms 9, and bolts 16 serving to secure the wheel assemblies in the conventional manner. Axles 17 span the wheel forks 13 and the wheels W are fitted with suitable pneumatic tires 18 to properly support the weight imposed by the forward end of the trailer T.

The castered wheel assemblies C are provided so that the dolly and trailer can be backed without jack-knifing However, when the dolly and trailer are traveling in a forward direction, it is not desirable that the wheels be free to caster, since they would tend to drag and shimmy, and I therefore provide quickly releasable means for locking the wheels in position during the forward travel, said means being readily disengageable to allow the wheels to caster when it is desired to back up, as when parking the trailer for the night, and backing into driveways, garages and other places.

To lock the castered wheel assemblies in position for forward travel, an angularly disposed bar 19 is welded to the inner leg of each wheel fork 13 and openings (not shown) are provided in the outer free ends thereof. Brace arms B are pivotally secured to lugs 20 provided on the U-shaped member 8 by means of bolts 20ᵃ, each brace arm comprising a rod 21 provided with a bifurcated end section 22 suitably bored to accommodate the bolts 20ᵃ, the opposite end of the rod being threaded as shown for engagement with a locking member 23. The end of each member 23 is bifurcated as at 24 to accommodate the free end of the bar 19 therebetween, and said bifurcated end is also bored (not shown) to accommodate a pin 25 having a handle 26 for ready manipulation thereof. A bar strip 27 is secured to one face of each member 23, the upwardly bent end 28 being bored to accommodate the pin 25 which extends through the aligned bored openings in the bifurcated end 24 and the bar 19 respectively. A spring 29 is interposed between the end section 28 and the bifurcated end of each member 23 to normally hold the pin in position, said pin being withdrawn when necessary by pulling the handle 26 vertically to release the wheels for castering movement.

A lock nut 30 is provided on the rod 21, and it will be obvious that the length of the brace arm can be readily adjusted by turning the member 23 and then adjusting the lock nut 30 to hold it in adjusted position. Lugs 31 are provided on the one edge of the U-shaped member 8 and are bored as at 32 to accommodate the pin 25 when the brace arms are swung into engagement therewith, all as clearly shown in broken lines in Fig. 2 of the drawings.

The weight of the forward end of the trailer is imposed forwardly of the U-frame member 8, and spring mounts 33 having a channel shaped portion at one end are adjustably mounted by means of bolts 34 on plates 35 welded on the inner face of the vertical legs of the U-shaped frame member 8, said plates projecting forwardly beyond the U-frame 8 and being provided with an arcuate slot 36. The spring mounts 33 are disposed in facial contact with the plates 35, and a bolt 37 is provided as shown and projects through said arcuate slot, a nut 38 being provided thereon so that the spring mounts may be vertically adjusted about pivot points 34 and then secured in any desired position of adjustment.

Forwardly converging sets of leaf springs 39 are mounted on the upper and lower inwardly disposed legs 40 of each spring mount 33, openings (not shown) being provided in each of the legs 40 and the leaf spring assemblies 39 to accommodate bolts 41 which are secured by nuts.

The forward ends of the leaf spring assemblies are secured to head plates 43 by means of bolts 44, and a hitch block 45 is also interposed between and is secured to said plates, said block including a ball socket 46 for releasably accommodating the ball assembly 47 provided on the towing vehicle, so that the dolly may be connected thereto, the springs 39 and head plates 43 forming a resilient draft tongue E for the dolly.

The socket 46 and ball joint 47 are of conventional design and a locking lever is provided as usual, and I do not deem it necessary to further describe the construction or operation of these members.

A ball bolt 49 is bolted to the upper face of the upper plate 43 in the usual manner and accommodates the conventional ball socket 50 which is provided on the tongue 51 of the trailer T for securing the trailer to the dolly.

The vertical height of the rear bumper from the ground varies with the various models and makes of automobiles, and the adjustable tongue E provides for efficient, balanced operation and insures even distribution of the weight of the forward end of the trailer on the dolly, regardless of the make or model of the towing vehicle and/or the loading of the trailer and tow vehicle. To vertically adjust the draft tongue, it is merely necessary to loosen the nut 38, swing the tongue about the pivot points 34 to desired position, and again tighten the nut 38.

Rearwardly projecting lugs 52 are provided on the ends of the arms 9, and openings 53 are provided therein, and when it is desired to back the trailer, the brace arms B are first disconnected from the bars 19 by raising the pins 25 and swinging the arms to the position shown in broken lines in Fig. 2 of the drawings where the pins 25 will engage the openings 32 in the lugs 31 and hold the brace arms in adjusted position, thus permitting the wheel assembly to caster as desired without possibility of fouling the brace arms. Chains as shown in Figure 7 are then connected to the lugs 52 in any desired manner with the opposite ends of the chains connected to the trailer to form a reasonably taut connection, after which the towing vehicle can be backed to guide the trailer into a garage, driveway or other space, the chains holding the dolly frame in proper alignment with the trailer at all times.

My improved dolly is quickly and easily adjustable for use with automobiles of any bumper height and is mounted on castered wheels which can be normally locked in longitudinal position and then quickly released to allow easy and efficient backing.

From the foregoing description, it will be obvious that I have perfected a simple, practical and rugged trailer hitch dolly which can be readily and easily adjusted, and which can be economically manufactured and assembled.

What I claim is:

1. In a trailer dolly, a transverse frame, castered wheel assemblies including wheel forks supporting said frame, angularly disposed bars on the inner side of each wheel fork assembly, said bars being formed with openings in the free ends thereof, arms pivotally mounted on said frame forwardly of the free ends of said bars and swingable into releasable engagement with said bars, spring-tensioned pins on the free ends of said arms for accommodation in said openings to releasably lock said wheels in longitudinal position for forward travel, and means on said frame for hitching the dolly to a draft vehicle.

2. In a trailer dolly, a transverse frame, castered wheel assemblies including wheel forks supporting said frame, rearwardly angling horizontally disposed bars on the inner leg of each wheel fork, said bars being formed with passages in the free ends thereof, longitudinally adjustable brace arms pivotally mounted on said frame and swingable into releasable engagement with said bars, the free ends of said arms being bifurcated to accommodate said bars and formed with passages in alignment with the passages in said bars, brackets mounted on said arms, spring-pressed pins mounted on said brackets to extend into said aligned passages in said bifurcated ends of said bars and releasably lock said wheel assemblies in longitudinal position for forward travel, and means on said frame for hitching the dolly to a draft vehicle tow bar.

3. The combination defined in claim 1 in which lugs are provided on said frame spaced inwardly from the pivoted ends of said arms, and said arms are swingable away from said bars into engagement with said lugs and retained thereon by said pins when said wheels are released for castering movement.

4. In a trailer dolly, a transversely disposed substantially U-shaped frame having substantially horizontal extensions on the free ends thereof, wheel assemblies connected to said extensions supporting said frame, plates with arcuate slots therein mounted on said U-frame, a draft tongue comprising elongated channel-shaped spring mounts connected to a hitching block by superposed pairs of leaf springs pivotally connected to said frame, means on said spring mounts at points spaced from the pivotal axis of said tongue for accommodation in said slots, means for locking said draft tongue in adjusted position relative to said plates, and means for hitching said dolly to the tow bar of a draft vehicle.

5. In a trailer dolly, a transversely disposed, substantially U-shaped frame, wheel assemblies connected to the ends thereof and supporting said frame, substantially longitudinally extending, spaced-apart plate members on said frame interjacent the ends thereof, a longitudinally extending draft tongue comprising spaced-apart, elongated, generally channel-shaped spring mount members, connected to a hitching block by superposed pairs of leaf springs, pivotally connected to said frame to swing in a vertical plane, the said plates, and the webs of said spring mounts being disposed in adjacent relationship to form sets of adjacent members each comprised of a plate member and a spring mount member, each set having a member with arcuate guide means formed therein and a member with means spaced longitudinally from the pivotal axis of said draft tongue for accommodation in said guide means, means for locking said draft tongue in adjusted vertical position relative to said plates, and means on said frame for hitching the tongue of said dolly to the tow bar of a draft vehicle.

References Cited in the file of this patent

UNITED STATES PATENTS

| Number | Name | Date |
|---|---|---|
| 1,485,179 | Funk | Feb. 26, 1924 |
| 1,941,400 | Johnson | Dec. 26, 1933 |
| 2,302,246 | Nelson | Nov. 17, 1942 |
| 2,379,265 | Whitmer | June 26, 1945 |
| 2,463,926 | Ward | Mar. 8, 1949 |
| 2,519,564 | Hagg | Aug. 22, 1950 |
| 2,592,219 | West et al. | Apr. 8, 1952 |